Figure 1:
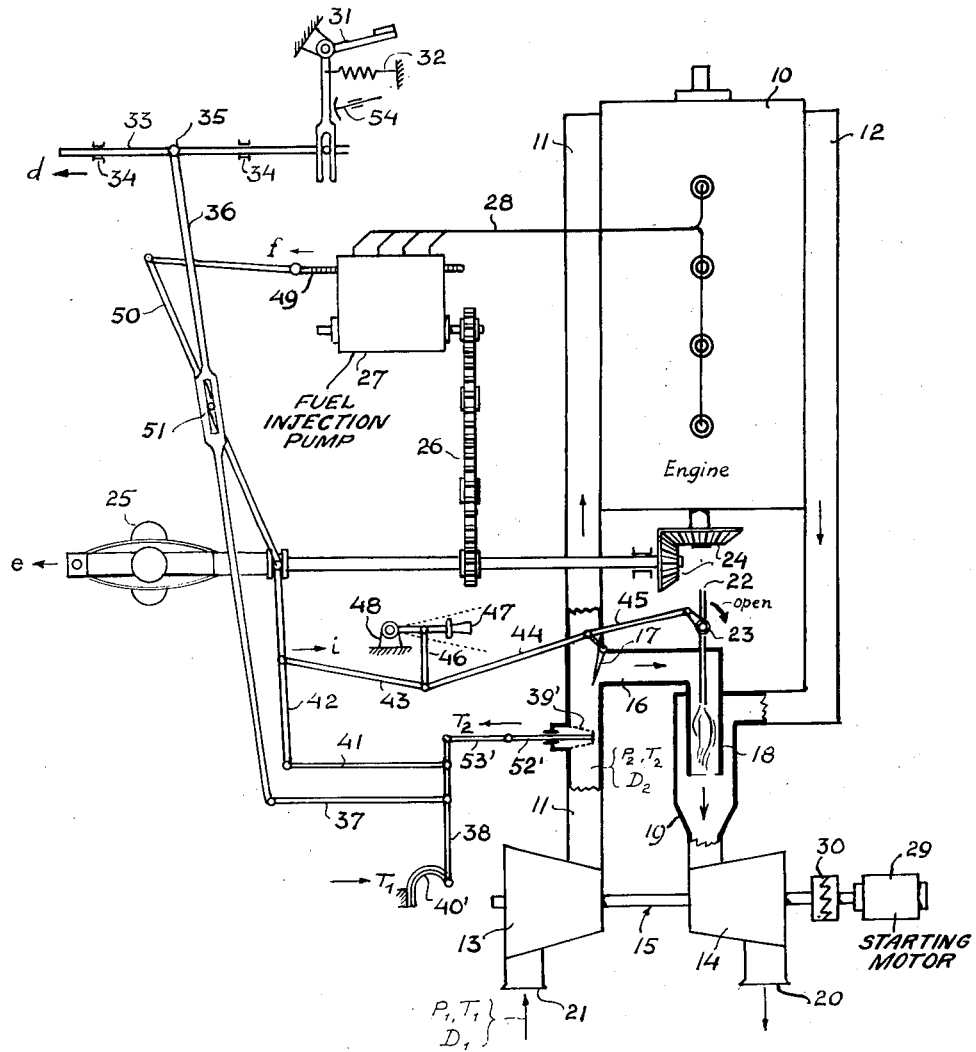

Patented Aug. 26, 1952

2,608,051

UNITED STATES PATENT OFFICE 2,608,051

CONTROL SYSTEM FOR TURBOCHARGED COMPRESSION - IGNITION INTERNAL - COMBUSTION ENGINES

Frederick Nettel, Manhasset, N. Y.

Application August 25, 1947, Serial No. 770,395

16 Claims. (Cl. 60—13)

This invention deals with internal combustion engines working on the compression-ignition (diesel) system having an exhaust gas turbine-driven supercharger set mechanically independent of the engine shaft and a combustion chamber external to the engine cylinders in which fuel is burned in air, bypassed from the delivery side of the charging blower, and the resultant hot gases utilized in said gas turbine.

It is an object of this invention to provide methods and means for operation of engines of the specified character by incorporating control devices for the engine, gas turbine and charging blowers which satisfy the charging and scavenging requirements of the engines under all conditions of engine operation.

It is a further object of the invention to superimpose on the engines torque-speed characteristics to suit the particular application, for example automotive, traction, cranes, and water or air propellers.

It is another object of the invention to provide methods and means to compensate for such changes in the state of the ambient air as temperature, pressure and density, so as to maintain efficient and reliable operation of the engines. The magnitude of these influences is so great, that neglect thereof may even prevent operation of the engines. Changes in ambient air temperature, for example, have a very important bearing, since the compression work for a unit weight of air increases with the absolute temperature at the compressor intake.

For the temperature range from 0 to 100 deg. F. a work difference of 22 per cent is experienced. It is obvious that this affects the power balance in the supercharger set radically, and it is equally obvious that it is wrong to use only the pressure at the delivery side of the compressor to effect said power balance in a satisfactory manner.

It is yet another object of this invention to provide control methods and means for the specified engines which allow fast response to load changes, this being important in order to achieve fast acceleration while maintaining clean combustion in the cylinders. Control means according to this invention include such as allow constant output operation over wide speed ranges, or in other words, which impose torque-converter characteristics on the engine. Such control involves rapid and large changes in the output of the gas turbine driving the charging blower. These cannot be accomplished by burning fuel only in the residual oxygen of an engine exhaust, due to insufficient oxygen in the exhaust and due to the limits of the gas temperature at the turbine inlet for metallurgical reasons. This invention, therefore, provides widely different mass flows of the working medium (air, gas) through the engine and turbine, respectively. Such method of control is decisive for starting highly supercharged engines, designed with reduced volumetric compression ratio in the cylinders, which cannot be started or operated at low loads and speeds with low charging pressures, because the charge would not reach the compression and temperature necessary for firing.

Other objects of the invention will in part be obvious and in part hereinafter pointed out.

The invention accordingly consists in the features of construction, arrangements of elements, combinations of parts, and groupings of steps illustrated in the drawings and described in detail hereinafter, and the scope of which will be apparent from the appended claims.

Figure 2:
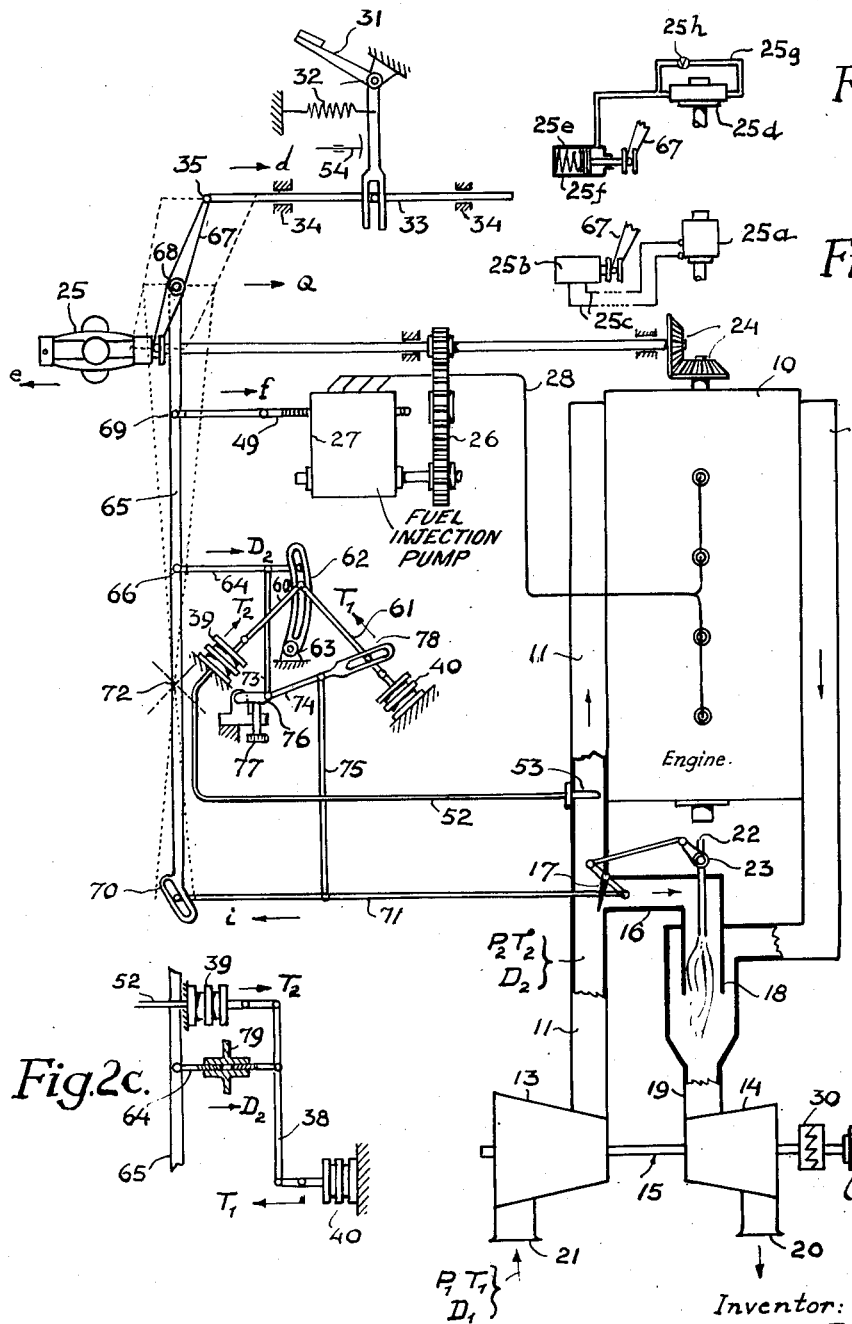

In the accompanying drawings in which are shown various possible embodiments of the invention, Fig. 1 is a schematic view of a compression-ignition engine plant constructed in accordance with my invention and suitable for automotive and similar applications;

Fig. 2 is a similar view of a modified form of my invention for the same purposes.

Figure 3:
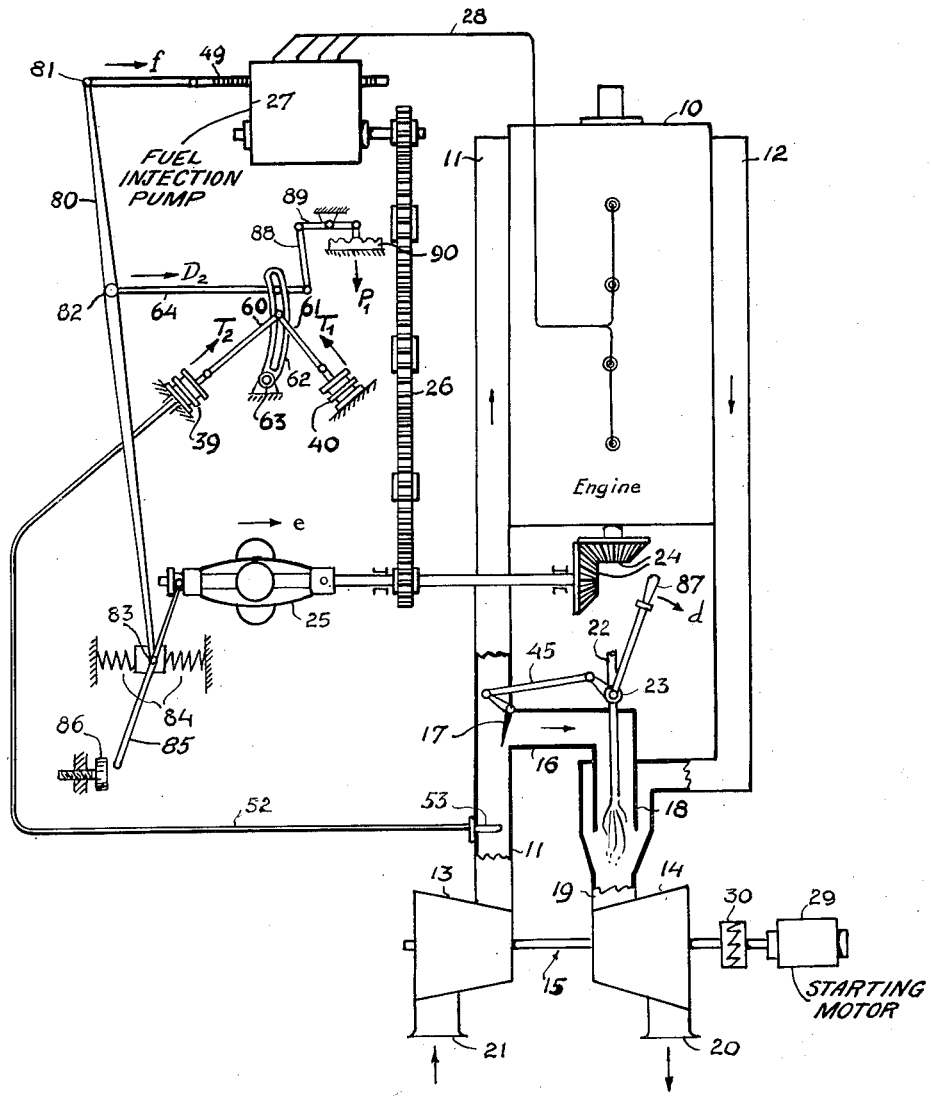

Figs. 2a, 2b, and 2c show details of modifications applicable to the plants of Fig. 1 and Fig. 2;

Fig. 3 is a similar view showing a plant particularly suited for marine and locomotive drives.

Controls of the particular type which incorporate torque-converter characteristics into an engine, or at least approximate it, according to my invention should take into account three major independent variables, viz:

(a) The absolute intake air pressure $P_1$ (the pressure of the ambient air).

(b) The absolute intake air temperature $T_1$ (the temperature of the ambient air).

(The ratio of $a$ and $b$ defines the intake air density $D_1$) and (c) The torque resistance of the engine Q.

Such controls also take into account one arbitrarily set independent variable, viz:

(d) The power lever (accelerator) position, which may be chosen to predetermine the desired power output.

An automatic control system according to my invention is designed so that the thermomechanical system consisting of engine, engine fueling, supercharger and fueling of the external combustion chamber self-establishes one and only one condition of equilibrium for any given set of the four independent variables $a$–$d$, said condition corresponding to a desired regulation. In the examples of Figs. 1 and 2 the regulation is that of perfect (or approximated) torque-conversion, that is, constant power output with the engine torque varying inversely with the engine R. P. M. Moreover, the automatic control is designed so that said equilibrium establishes itself quickly and with adequate stability throughout the range of operation.

The method and means of the control system take into consideration the following dependent variables, viz:

(e) The engine speed (R. P. M.), dependent on $c$ and $d$, (f) The setting of the engine fuel pump (fuel quantity per working stroke), dependent on $d$ and $e$, (g) The weight of the intake air to the engine per unit time, determined by $d$, (h) The engine exhaust gas temperature, dependent mainly on $d$ and $e$, (i) The fuel and air setting for the auxiliary external combustion chamber which has to be correlated automatically with $a$–$d$, (j) The supercharger R. P. M., dependent on $b$, $h$, and $i$, (k) The absolute air pressure $P_2$ at the engine intake manifold whose ratio to $P_1$ depends on $b$, $g$ and $j$, (l) The absolute air temperature $T_2$ at the engine intake manifold, dependent on $a$, $b$, and $k$, (m) The air density $D_2$ at the engine intake manifold, being the ratio of $k$ and $l$, and (n) The gas temperature at the turbine inlet, dependent on $g$, $h$ and $i$, but also related to $b$ and $j$ or $k$, respectively.

The system of control according to the examples of Fig. 1 or 2 is so designed that for any arbitrary power lever position $d$ and self-established engine speed $e$, (1) the total fuel input to the engine per unit of time, $e$ times $f$, remains substantially a constant defined by $f$;

(2) the total air weight taken in by the engine per unit time, $e$ times $m$, also remains substantially a constant defined by $d$.

Reverting now in detail to Fig. 1, 10 denotes an engine, either two-stroke or four-stroke, having an intake manifold 11 and an exhaust manifold 12 which are connected respectively to the blower 13 and turbine 14 of a turbocharger set 15. A bypass conduit 16 having a regulating flap valve 17 leads from the intake manifold 11 to an auxiliary combustion chamber 18 whose outlet is connected by a duct 19 to the turbine inlet. The exhaust manifold 12 also runs into said duct. The turbine discharges into the atmosphere at 20. Ambient air is taken into the system at the blower intake 21. The chamber 18 obtains fuel from an external source (not shown) through a pipe 22 having a control valve 23. Driven from the engine shaft through bevel gears 24 is a speed responsive element, here shown as a flyball governor 25, and through a gear train 26, a fuel injection pump 27, for supplying fuel to the engine cylinders through fuel lines 28. A starting motor 29 of any known type is coupled with the turbocharger set 15 by an overrunning clutch 30.

The engine is externally regulated by a bell crank lever 31 having a forked end biased to the right by a spring 32. Said forked end engages a rod 33 guided for axial movement in bearings 34 as shown. The connection is such that when lever 31 is operated clockwise against the force of spring 32 the rod 33 will shift to the left. Pivotally connected to a point 35 on the rod 33 is a lever 36. The lower end of said lever is pivotally connected to one end of a link 37. The other end of the link 37 is pivotally connected to a floating rod 38. The upper end of rod 38 is pivotally supported by the free end of a rod expansion type thermostat 39' and the lower end of said rod is supported similarly by another thermostat of the bi-metal type 40'. The floating rod is connected to the flyball governor by levers 41, 42.

The flap valve 17 and fuel valve 23 are operated from the lever 42 by links 43, 44 and 45, the arrangement being such that both valves are moved toward fully open position when the lever 42 moves toward the right. A rod 46 supports the point of pivotal attachment between the links 43, 44. Said rod is pivotally attached to a control arm 47 which is oscillatable about a bracket support 48 thereby enabling a manual control of the flap valve and fuel valve to be effected which is independent of movement of the lever 42. The control arm is movable between two extreme positions indicated by dotted lines.

The setting $f$ of the fuel pump 27 which controls the quantity of fuel injected each stroke, is determined by the position of a rack 49 which is connected by a link 50 to the flyball governor 25. Said link 50 crosses the lever 36 and is pivotally secured thereto by a pin-and-slot connection 51.

The arrows denoted by the reference characters $d$, $e$, $f$, $i$, $T_1$ and $T_2$ indicate the direction of motion experienced by certain elements of the control system upon increasing values of these variables hereinbefore identified as the power lever position, the engine speed, the engine fuel pump setting, the fuel and air setting for the auxiliary combustion chamber, the ambient air temperature, and the temperature in the engine air intake manifold, respectively.

The thermostat 40' is responsive to the temperature of the ambient air at the blower intake 21 so that a rise in said temperature will cause the bi-metal strip to straighten and thus move the rod 38 to the right, as indicated. The expansion rod 52' of the thermostat 39' in the engine air intake manifold 11, is connected by a link 53' to rod 38. Thus said rod 52' is responsive to the compression and temperature $T_2$ of the charging blower and moves the floating rod 38 to the left, as indicated, with rising temperature.

The plant operates as follows: Assuming that the power required is set by the lever 31 to a value indicated by the position of rod 33 and that the torque furnished requires a certain engine speed corresponding to that power, the positions of the elements 36, 42 and 50 bear such a mutual relationship that under the given conditions a certain amount of air is passed through the flap valve 17 and a certain amount of fuel $i$, coordinated to it, is burned in the chamber 18, these amounts being such that the gases from the chamber 18 together with the engine exhaust furnish sufficient energy in the turbine 14 to drive the blower 13 at a speed proper to furnish the necessary weight of air to the engine per unit time. To this, the setting of elements 49 and 50 coordinates a suitable amount of fuel $f$ per unit time, so that clean combustion is assured.

If now, without change in the setting $d$ of the power lever, i. e. with the position of point 35 unaltered, a greater torque has to be furnished, the speed of the engine will drop, causing the lower end of link 50 and the upper end of lever 42 to move toward the right. This causes the flap valve 17 and fuel valve 23 to open more, thus increasing combustion in the chamber 18 and thereby raising the temperature and flow of combusted gases to the turbine 14. As a consequence the speed of the set 15 will increase and consequently the pressure in the intake manifold 11 will rise. Such rise increases the air weight reaching the cylinders per working stroke. The movement of the lower end of the link 50 around its pivot 51 on lever 36 simultaneously moves rack 49 to the left, thus admitting more fuel to the engine per working stroke at the reduced speed. Moreover, the rising temperature at the thermostat 39' intensifies this motion because expansion of the rod 52' moves the floating rod 38 to the left, thus shifting point 51 toward the left. This is proper because the cylinders now are receiving an increased air charge and consequently more fuel can be efficiently burned. Expansion of the rod 52' also moves lever 42 toward the left, thereby gradually reducing the fuel quantity burned in the chamber 18, until a new state of equilibrium is so established, that at the new engine speed the rate of air and fuel weights charged to the engine per unit time remain substantially unchanged, but the air and fuel weight charged per working stroke is increased inversely with the speed change, enabling the engine to furnish substantially the same power output at the reduced speed.

With decrease in the required torque reverse motions take place.

An increase in the temperature of the ambient air has, for a given working pressure ratio in the blower 13, the effect of reducing the air weight delivered to the engine, which consequently is able to burn less fuel if clean combustion is to be maintained. This reduction in fuel is provided by straightening of the thermostat 40' which moves the floating rod 38, and, therefore, the element 49, 50 toward the right, reducing the amount of fuel admitted to the engine per working stroke. At the same time lever 41 pulls lever 42 to the right thereby increasing $i$ somewhat which is proper since more work is needed for compression with a higher $T_1$. This compensation can be adjusted further by raising the arm 47 somewhat. 54 is a push stop for adjusting idling.

Engines designed for operating with air intake at ambient air pressures must have volumetric compression ratios on the cylinders of at least 1:11 to ensure ignition of fuel at starting. In designs for high supercharging this ratio must be reduced below 1:11 so as to avoid excessive operating pressure.

When starting such engines from cold condition it is necessary to provide charging air under high pressure at the time the engines are cranked. Such pressure is supplied by the set 15 which is started by the motor 29, the latter creating a stream of air which flows from the compressor 13 through the flap valve 17 and chamber 19 to the turbine 14. With the set thus rotated, the flap valve and valve 23 for the fuel are operated by moving the control arm 47 to the upper position, indicated by a dotted line. The fuel in the chamber 19 now is ignited, and the set 15 begins to work as a power self-supporting gas turbine plant, speeding up beyond the speed of the starting motor 29 so that the latter is uncoupled automatically by the clutch 30. Since the air mass flow working in the gas turbine system is completely independent of the engine, the pressure in the intake manifold 11 can be arranged to be sufficiently high so that when the engine is cranked, reliable starting is assured. After the engine is started, the control arm 47 is moved back to the middle position, thus re-establishing proper coordination of the fuel quantities $f$ and $i$ going to the engine and chamber 19 respectively.

The embodiment of the invention shown in Fig. 2 shows an alternative means for obtaining torque converter performance of the supercharged engine. Parts identical with those in Fig. 1 are described therein by the same numerals. In this example, as well as in the one shown in Fig. 3, vapor pressure type thermostats are used instead of the types indicated in Fig. 1. 39 is an elastic bellows connected by tube 52 to the vapor pressure thermostat 53 disposed in pipe 11. The thermostat 40 also consists of an elastic bellows filled with a gas or vapor whose pressure changes with the ambient air temperature or rather with that of the air at the intake 21 to the compressor 13. As can be seen, the basic arrangement of engine, fuel pump and governor drive, supercharger set and auxiliary combustion chamber are the same as in Fig. 1. In this plant a certain ratio of the fuel fed to the engine per working stroke $f$ to the density of the air charge $D_2$ is maintained, or closely approximated, over the desired speed range of the engine by somewhat different means.

At a given intake air pressure $P_1$, the air density $D_2$ in the intake manifold 11 is defined by a certain non-linear ratio of the temperatures $T_2$ and $T_1$. A movement substantially proportional to $D_2$ is obtained by having the thermostatic bellows 39, 40 arranged at an angle and acting through rods 60, 61 jointly on a pivot block slidable in the suitably shaped slot of a lever 62 turning around a fixed point 63 at its lower end.

For any change in the temperatures $T_1$ and $T_2$ the horizontal motion of lever 62 is substantially proportional to $D_2$. This motion is transmitted by a rod 64 to a lever 65 at a pivot point 66. The pivot point 35 is connected to the flyball governor by a lever 67, and a pivot point 68 on the latter is connected to the upper end of the lever 65. The rack 49 for adjusting the fuel $f$ per working stroke of the fuel pump 27 is operated from a pivot point 69 on the lever 65. Said lever 65 has a slot 70 at its lower end from which motions are transmitted by a rod 71 to the flap valve 17 and the fuel valve 23 which controls the fuel quantity $i$ used in the chamber 19. The particular means described for introducing into the control system a motion proportional to the density of the compressed air does not form per se part of this invention; obviously other means may be substituted therefor.

The plant operates as follows: rod 33 prescribes by the position of point 35 a definite engine load P. The system may be in equilibrium, as shown, at a certain engine speed $e$ so that the position of lever 68 determines a certain fuel quantity per working stroke $f$ at a definite air density $D_2$ in the intake manifold 11 and a definite setting of valves 17 and 23 corresponding to an operating condition of the set 15 which furnishes air of density $D_2$.

If now, with an unchanged setting of the point 35, that is, constant power output of the engine, the torque requirement increases, the fall in engine speed $e$ causes the lower end of lever 67 to move toward the right, moving also point 68, so that the lever 65 will turn around point 66 (since $D_2$ has not changed as yet) and pull the rod 71 strongly to the left. This causes the set 15 to speed up and to quickly increase $D_2$. Upon the first motion of lever 65 around point 66 point 69 moves to the right, thereby increasing the setting $f$ of fuel to the engine somewhat, which is permissible, since there is always some air surplus. However, after a short time, due to the increase in density $D_2$, lever 65 is pulled to the right by rod 64, with point 68 acting as the pivot, thus increasing $f$ further, until the correct ratio $f : D_2$ is reestablished at the lower engine speed, with the power output unchanged. The motion of lever 65 around point 68 moves the rod 71 back somewhat from its previously reached position to the right, establishing the correct coordination of $D_2$ and $f$. The temporary "over-regulation" of the fuel $i$ is intentional and serves to increase the speed of response of the whole system to torque changes.

It should be noted that the motion of point 68 indicates the change in torque Q furnished, and that, as long as the ratio $f : D_2$ is constant, the lever 65 turns with changing torque round the virtual, though physically non-existent, pivot point 72. Thus the extreme left position of the lever 65, indicated by a dotted line, corresponds to smallest power P, smallest torque Q, highest engine speed $e$, smallest $f$ and $D_2$ in correct ratio and smallest $i$. The extreme right position of the lever 65 also indicated by a dotted line, indicates maxima of operation coordinated to minimum engine speed. Between these two speeds, which can be selected arbitrarily, the engine shows torque converter characteristics, the regulation being substantially correct for a given intake air pressure $P_1$ to the compressor 13.

In plants which have to operate temporarily or permanently at high altitudes, a corrective mechanism may be incorporated. For this purpose rods 73, 74 and 75 are provided, which all can be operated from a lever 76, the latter being lifted or lowered by a screw 77. To compensate for lower $P_1$, the lever 76 is lowered, causing the rod 64 to turn downwards around point 66 as pivot, thus correcting for density $D_2$ which has decreased. Simultaneously the rod 74 moves downwards around a pivot point 78 provided in the rod 61. This forces the rod 75 down and pushes the rod 71 downwards too. The left hand end of the latter moves in the slot 70 which, as shown, causes rod 71 to move to the right with a consequent reduction in output of the combustion chamber 19 to compensate for the decrease in $D_2$. For higher $P_1$ the lever 76 is raised and reverse motions are experienced.

Instead of using a fly-ball governor, as shown in Figs. 1 and 2, for a speed responsive element, other means may be provided; such means for use in plant such as illustrated in Fig. 2 are shown in Fig. 2a where a tachometer dynamo 25a is shown. Said dynamo is coupled to the engine shaft and operates a solenoid 25b through leads 25c. The solenoid acts on the lever 67.

Still another alternative speed responsive means is shown in Fig. 2b, the same constituting a hydraulic pump 25d which furnishes a fluid pressure proportional to the engine speed when coupled to the engine shaft. This changing pressure operates a spring loaded piston 25e disposed in a cylinder 25f connected to the pump by piping 25g through an adjusting valve 25h. Piston 25e moves in proportion to the engine speed and operates lever 67 in the same manner as the fly-ball governor in Fig. 2.

Instead of the particular arrangement of thermostat bellows shown in Fig. 2 to reproduce changes in $D_2$, other arrangements may be used. One such alternative arrangement is shown in Fig. 2c with the bellows 39, 40 operating in opposite directions. In this case, which is similar to that used in Fig. 1, correction for changes in $P_1$ can be effected by operating a turnbuckle 79, provided in the rod 64, connecting the floating rod 38 to the lever 65 of Fig. 2.

Fig. 3 shows an embodiment of my invention particularly suited for driving water or air propellers, or locomotives. In this drawing elements identical with those in Fig. 1 or 2 are also indicated by identical numerals. In said embodiment the rack 49 and rod 64 controlling the fuel supply $f$ to the engine per working stroke and the density $D_2$ of the compressed air in the intake manifold 11, respectively, are connected at points 81 and 82 to a lever 80. The lower end 83 of this lever is resiliently pivoted between two springs 84. Point 83 is connected to the flyball governor 25 by a lever 85. The movement of the lower end of said lever 85, to the left is limited by a fixed or adjustable stop 86. The valves 17, 23 in this case are operated by a hand lever 87.

For starting the plant, the lever 87 is used in the same manner as described in Fig. 1 for the control arm 47. Assuming the plant to be operating at a certain load, the lever 87 prescribes a working condition for the set 15 which at a certain pressure at the intake $P_1$ furnishes air of a certain density $D_2$ to the engine. The bellows 39, 40 jointly act via lever 62 on the rod 64 which moves the lever 80 around pivot 83 if the fuel adjustment $f$ by rack 49 is not strictly in the prescribed ratio to $D_2$. It can be seen that every motion of the hand lever 87, i. e. every change in $D_2$, is immediately automatically followed by a corresponding adjustment in the position of the rod 80 in such a manner that the ratio of $f$ to $D_2$ is kept substantially constant. The important fact here is, that the control system provides, for example for more power, first a higher air charge to the engine, which is followed by an increase in fuel to the cylinders, so that clean combustion always is safeguarded. The speed of the engine can adjust itself to the torque requirement and the governor 23 comes into operation only if the engine speed $e$ exceeds a predetermined value, which in ship propellers might occur if the propeller is lifted out of the water, in aircraft propellers if they are feathered, and in locomotives if the wheels slip. In such cases the governor 25 pulls point 83 against the action of springs 84 to the right, turning the lever 80 around point 82 as a fulcrum, and so immediately reduces the fuel fed to the engine by pulling the rack 49 to the right.

To automatically compensate for changes in $P_1$, rod 88, lever 89 and aneroid barometer box 90 may be provided. With decreasing pressure box 90 expands and pushes rod 64 downwards around point 82 as a fulcrum. The effect is similar to a movement of the lever 76 in Fig. 2.

It is immaterial for the purposes of my invention what particular type of engine is used; it may work on two-stroke cycle or four-stroke cycle in either single or multiple cylinder design.

It is also immaterial what types of machines are used for the supercharger means, and whether or not cooling of the charging air is resorted to.

It is further immaterial for my invention what kind of fuel is burned in the engine and/or auxiliary combustion chamber, and whether or not the same or different fuels are used in the engine and combustion chamber, respectively.

Having thus described my invention, I claim as new and desire to secure by Letters Patent:

1. The combination with a reciprocating internal combustion engine of the compression-ignition type, an exhaust-gas turbine-driven blower independent of the engine shaft supplying compressed air to the engine air intake, and means to burn additional fuel outside the engine in compressed air branched off from the blower and to lead the resultant products of combustion to the gas turbine: of means to govern the amount of fuel fed per working stroke to the engine, means to govern the rate of fuel burned outside the engine, and means responsive to the engine speed and to the temperature $T_2$ of air issuing from the blower for controlling both said fuel governing means in such manner that with falling engine speed the fuel quantities burned outside and inside the engine increase and with increasing temperature $T_2$ the fuel quantity burned inside the engine increases.

2. The combination with a reciprocating internal combustion engine of the compression-ignition type, an exhaust-gas turbine-driven blower independent of the engine shaft supplying compressed air to the engine air intake, and means to burn additional fuel outside the engine in compressed air branched off from the blower and to lead the resultant products of combustion to the gas turbine: of means to govern the rate of fuel burned outside the engine, means responsive to the temperature $T_2$ of air issuing from the blower, and means to govern the amount of fuel fed per working stroke to the engine, said last named means being controlled by said first two named means in such manner that the fuel quantity fed to the engine increases with an increase in the fuel burned outside the engine and with increasing temperature $T_2$.

3. The combination with a reciprocating internal combustion engine of the compression-ignition type, an exhaust-gas turbine-driven blower independent of the engine shaft supplying compressed air to the engine air intake, and means to burn additional fuel outside the engine in compressed air branched off from the blower and to lead the resultant products of combustion to the gas turbine: of means to govern the rate of fuel burned outside the engine, means responsive to the density $D_2$ of air issuing from the blower, and means to govern the amount of fuel fed per working stroke to the engine, said last named means being controlled by said first two named means in such manner that the fuel quantity fed to the engine increases with an increase in the fuel burned outside the engine and with increasing density $D_2$.

4. The combination with a reciprocating internal combustion engine of the compression-ignition type, an exhaust-gas turbine-driven blower independent of the engine shaft supplying compressed air to the engine air intake, and means to burn additional fuel outside the engine in compressed air branched off from the blower and to lead the resultant products of combustion to the gas turbine: of means to govern the rate of fuel burned outside the engine, means responsive to the temperature $T_1$ of air taken into the blower and to the temperature $T_2$ of air issuing from the blower, and means to govern the amount of fuel fed per working stroke to the engine, said last named means being controlled by said first two named means in such manner that the fuel quantity fed to the engine increases with an increase in the fuel burned outside the engine and with increasing temperature $T_2$ and decreases with increasing temperature $T_1$.

5. The combination with a reciprocating internal combustion engine of the compression-ignition type, an exhaust-gas turbine-driven blower independent of the engine shaft supplying compressed air to the engine air intake, and means to burn additional fuel outside the engine in compressed air branched off from the blower and to lead the resultant products of combustion to the gas turbine: of means to govern the quantity of branched off air and the amount of fuel burned therein and means responsive to the engine speed and to the temperature of air issuing from the blower for controlling said governing means in such manner that the quantity of branched off air and amount of fuel burned therein increase with decreasing engine speed and with decreasing temperature of air issuing from the blower.

6. The combination with a reciprocating internal combustion engine of the compression-ignition type, an exhaust-gas turbine-driven blower independent of the engine shaft supplying compressed air to the engine air intake, and means to burn additional fuel outside the engine in compressed air branched off from the blower and to lead the resultant products of combustion to the gas turbine: of means to govern the quantity of branched off air and the amount of fuel burned therein and means responsive to the density of air issuing from the blower for controlling said governing means in such manner that the quantity of branched off air and amount of fuel burned therein increase with decreasing density of air issuing from the blower.

7. The combination with a reciprocating internal combustion engine of the compression-ignition type, an exhaust-gas turbine-driven blower independent of the engine shaft supplying compressed air to the engine air intake, and means to burn additional fuel outside the engine in compressed air branched off from the blower and to lead the resultant products of combustion to the gas turbine: of means to govern the quantity of branched off air and the amount of fuel burned therein and means responsive to the temperature of air taken into the blower and to the temperature of air issuing from the blower for controlling said governing means in such manner that the quantity of branched off air and amount of fuel burned therein increase with decreasing temperature of air issuing from the blower and with increasing temperature of air taken into the blower.

8. The combination with a reciprocating internal combustion engine of the compression-ignition type, an exhaust-gas turbine-driven blower independent of the engine shaft supplying compressed air to the engine air intake, and means to burn additional fuel outside the engine in compressed air branched off from the blower and to lead the resultant products of combustion to the gas turbine: of means to govern the quantity of branched off air and the amount of fuel burned therein and means responsive to the engine speed and to the intake and discharge temperatures of the blower air for controlling said governing means in such manner that the quantity of branched off air and amount of fuel burned therein increase with decreasing engine speed, with decreasing blower discharge temperature and with increasing blower intake temperature.

9. The combination with a reciprocating internal combustion engine of the compression-ignition type, an exhaust-gas turbine-driven blower independent of the engine shaft supplying compressed air to the engine air intake, and means to burn additional fuel outside the engine in compressed air branched off from the blower and to lead the resultant products of combustion to the gas turbine: of means to govern the amount of fuel fed per working stroke to the engine, means to govern the quantity of branched off air and the amount of fuel burned therein and means responsive to the temperature of air issuing from the blower for controlling both said governing means in such manner that with increasing temperature of air issuing from the blower the fuel fed to the engine increases and the quantity of branched off air and amount of fuel burned therein decrease.

10. The combination with a reciprocating internal combustion engine of the compression-ignition type, an exhaust-gas turbine-driven blower independent of the engine shaft supplying compressed air to the engine air intake, and means to burn additional fuel outside the engine in compressed air branched off from the blower and to lead the resultant products of combustion to the gas turbine: of means to govern the amount of fuel fed per working stroke to the engine, means to govern the quantity of branched off air and the amount of fuel burned therein and means responsive to the density of air issuing from the blower for controlling both said governing means in such manner that with increasing density of air issuing from the blower the fuel fed to the engine increases and the quantity of branched off air and amount of fuel burned therein decrease.

11. The combination with a reciprocating internal combustion engine of the compression-ignition type, an exhaust-gas turbine-driven blower independent of the engine shaft supplying compressed air to the engine air intake, and means to burn additional fuel outside the engine in compressed air branched off from the blower and to lead the resultant products of combustion to the gas turbine: of means to govern the amount of fuel fed per working stroke to the engine, means to govern the quantity of branched off air and the amount of fuel burned therein and means responsive to the temperature of air taken into the blower and to the temperature of air issuing from the blower for controlling both said governing means in such manner that with increasing temperature of air taken into the blower the fuel fed to the engine decreases and the quantity of branched off air and amount of fuel burned therein increase, and with increasing temperature of air issuing from the blower the fuel fed to the engine increases and the quantity of branched off air and amount of fuel burned therein decrease.

12. The combination with a reciprocating internal combustion engine of the compression-ignition type, an exhaust-gas turbine-driven blower independent of the engine shaft supplying compressed air to the engine air intake, and means to burn additional fuel outside the engine in compressed air branched off from the blower and to lead the resultant products of combustion to the gas turbine: of means to govern the amount of fuel fed per working stroke to the engine, means to govern the quantity of branched off air and the amount of fuel burned therein and means responsive to the engine speed and to the intake and discharge temperatures of the blower air for controlling both said governing means in such manner that with decreasing engine speed the fuel fed to the engine and the quantity of branched off air and amount of fuel burned therein increase, and that with increasing blower intake temperature or decreasing blower discharge temperature the fuel fed to the engine decreases and the quantity of branched off air and amount of fuel burned therein increase.

13. The combination with a reciprocating internal combustion engine of the compression-ignition type, an exhaust-gas turbine-driven blower independent of the engine shaft supplying compressed air to the engine air intake, and means to burn additional fuel outside the engine in compressed air branched off from the blower and to lead the resultant products of combustion to the gas turbine: of means to govern the amount of fuel fed per working stroke to the engine, means to govern the quantity of branched off air and the amount of fuel burned therein, means responsive to engine speed, means responsive to the temperature of air taken into the blower, means responsive to the temperature of air issuing from the blower, and a linkage system connecting said speed and temperature responsive means with both said governing means so that both said governing means are controlled by the engine speed and by the intake and discharge temperatures of the blower air in such manner that with decreasing engine speed the quantity of branched off air and amount of fuel burned therein and the fuel fed to the engine increase, and that the fuel fed to the engine also increases with decreasing temperature of air taken into the blower and with increasing temperature of air issuing from the blower, while the quantity of branched off air and amount of fuel burned therein decreases with decreasing temperature of air taken into the blower and with increasing temperature of air issuing from the blower.

14. The combination with a reciprocating internal combustion engine of the compression-ignition type, an exhaust-gas turbine-driven blower independent of the engine shaft supplying compressed air to the engine air intake, and means to burn additional fuel outside the engine in compressed air branched off from the blower and to lead the resultant products of combustion to the gas turbine: of hand controlled means to set the quantity of branched off air and the amount of fuel burned therein, means to govern the amount of fuel fed per working stroke to the engine, means responsive to the temperature of air taken into the blower, means responsive to the temperature of air issuing from the blower, and a linkage system connecting said temperature responsive means with the second mentioned governing means so that said second mentioned governing means is controlled by the intake and discharge temperatures of the blower air in such manner that with the hand controlled means set to increase the quantity of branched off air and the amount of fuel burned therein an increase of the quantity of fuel fed to the engine results, and that with increasing blower intake temperature or decreasing blower discharge temperature the fuel fed to the engine decreases.

15. The combination with a reciprocating internal combustion engine of the compression-ignition type, an exhaust-gas turbine-driven blower independent of the engine shaft supplying compressed air to the engine air intake, and means to burn additional fuel outside the engine in compressed air branched off from the blower and to lead the resultant products of combustion to the gas turbine: of means to govern the amount of fuel fed per working stroke to the engine, means responsive to the temperature of air taken into the blower, means responsive to the temperature of air issuing from the blower and a system kinematically interconnecting said temperature responsive means and including an element which experiences a motion upon changes in said temperatures which is proportional to the change in density of air issuing from the blower, said element controlling said governing means in such manner that with increasing density of the air issuing from the blower the fuel fed to the engine increases.

16. The combination with a reciprocating internal combustion engine of the compression-ignition type, an exhaust-gas turbine-driven blower independent of the engine shaft supplying compressed air to the engine air intake, and means to burn additional fuel outside the engine in compressed air branched off from the blower and to lead the resultant products of combustion to the gas turbine: of means to govern the quantity of branched off air and the amount of fuel burned therein, means responsive to the temperature of air taken into the blower, means responsive to the temperature of air issuing from the blower, and a system kinematically interconnecting said temperature responsive means and including an element which experiences a motion upon changes in said temperatures which is proportional to the change in density of air issuing from the blower, said element controlling said governing means in such manner that the quantity of branched off air and amount of fuel burned therein increase with decreasing density of air issuing from the blower.

FREDERICK NETTEL.

REFERENCES CITED

The following references are of record in the file of this patent:

UNITED STATES PATENTS

| Number | Name | Date |
|---|---|---|
| 2,245,562 | Becker | June 17, 1941 |
| 2,379,455 | Prince | July 3, 1945 |
| 2,435,902 | Reggio | Feb. 10, 1948 |

FOREIGN PATENTS

| Number | Country | Date |
|---|---|---|
| 537,483 | Great Britain | June 24, 1941 |

OTHER REFERENCES

Ser. No. 288,979, Biechl (A. P. C.), published May 11, 1943.